A. H. THIELE.
WEIGHING MECHANISM FOR GROCERS' BINS.
APPLICATION FILED AUG. 10, 1909.

968,610.

Patented Aug. 30, 1910.

3 SHEETS—SHEET 1.

Witnesses
M. C. Lyddane
M. L. Lewis

Inventor
Albert H. Thiele
By
Woodward & Chandler
Attorneys

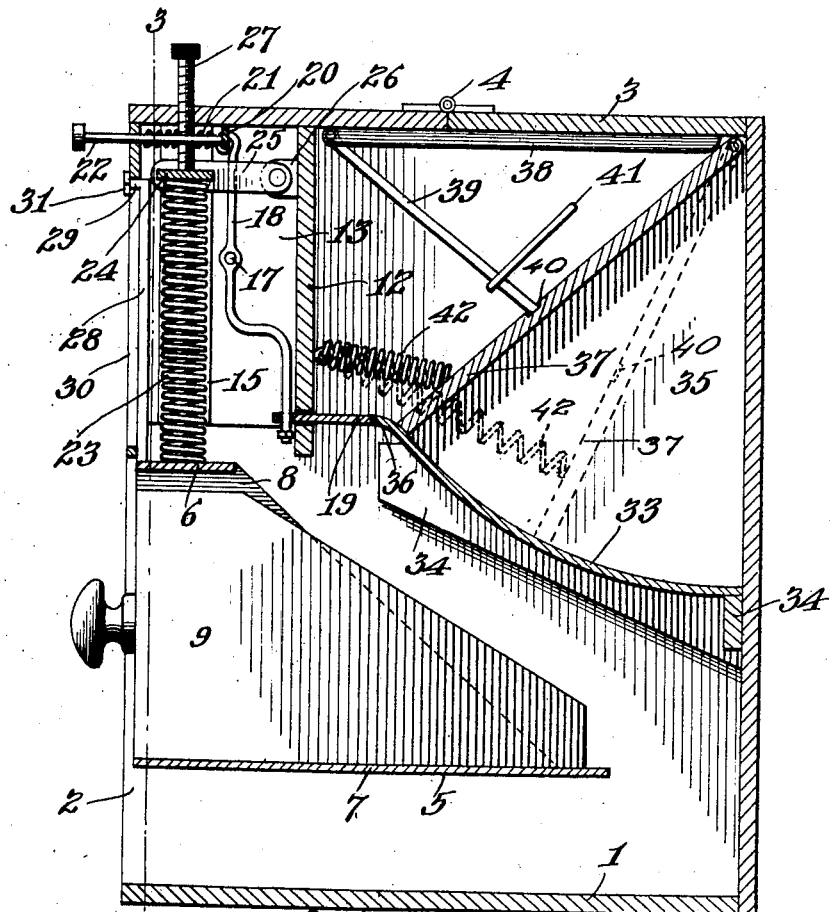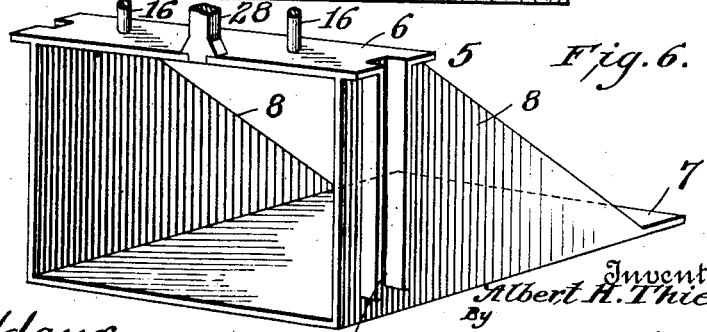

A. H. THIELE.
WEIGHING MECHANISM FOR GROCERS' BINS.
APPLICATION FILED AUG. 10, 1909.
968,610.
Patented Aug. 30, 1910.
3 SHEETS—SHEET 3.
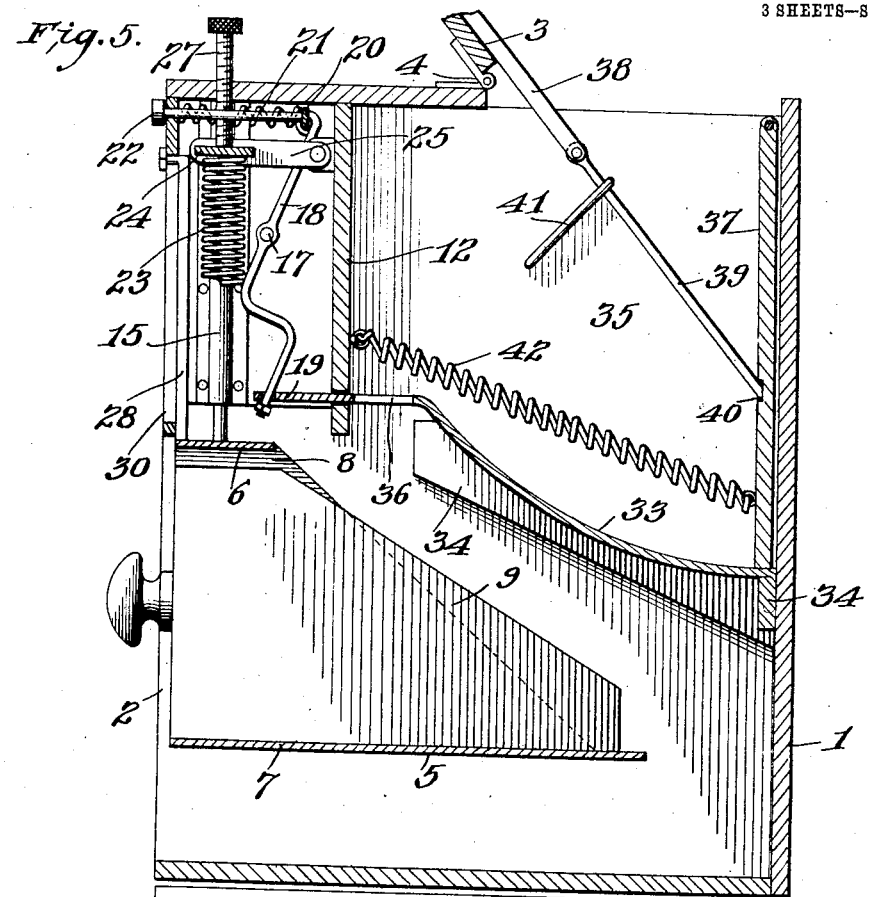
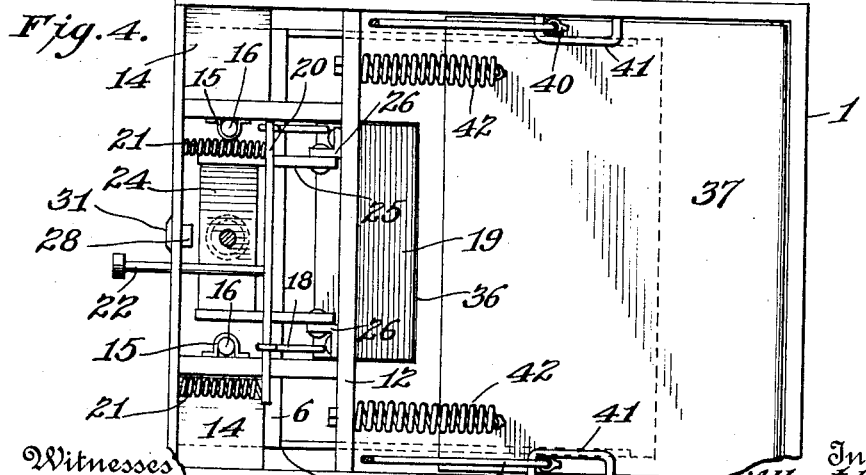
Witnesses
M. C. Lyddane
M. L. Lowe
Inventor
Albert H. Thiele
By
Woodward & Chandlee
Attorneys

UNITED STATES PATENT OFFICE.

ALBERT H. THIELE, OF SILVERLAKE, WISCONSIN.

WEIGHING MECHANISM FOR GROCERS' BINS.

968,610.  Specification of Letters Patent.  Patented Aug. 30, 1910.

Application filed August 10, 1909. Serial No. 512,129.

*To all whom it may concern:*

Be it known that I, ALBERT H. THIELE, a citizen of the United States, residing at Silverlake, in the county of Kenosha and State of Wisconsin, have invented certain new and useful Improvements in Weighing Mechanism for Grocers' Bins, of which the following is a specification.

This invention relates to new and useful improvements in a weighing mechanism which is adapted to operate in connection with grocers' bins or cans, such as are usually employed for containing teas, coffees, spices, and cereals.

The primary object of my invention is to provide a mechanism of this character, by means of which material may be automatically fed into a scoop which is disposed upon a vertically movable supporting diaphragm.

Another object is to provide suitable adjusting means for regulating the operation of the diaphragm so that the wear upon the various parts of the mechanism may be compensated for, whereby absolute accuracy of the weighing mechanism may be attained.

A further object is to provide a feeder plate pivotally mounted within the bin and operatively connected to the cover of the same, whereby the entire contents of the bin may be used.

A still further object is to provide an extremely simple construction of weighing mechanism, which will occupy but little space in the bin and which will be absolutely positive and accurate in its operation.

With these and other objects in view, the present invention consists in the combination and arrangement of parts as will be hereinafter more fully described and particularly pointed out in the appended claims, it being understood that changes in the specific structure shown and described may be made within the scope of the claims without departing from the spirit of the invention.

Figure 1:
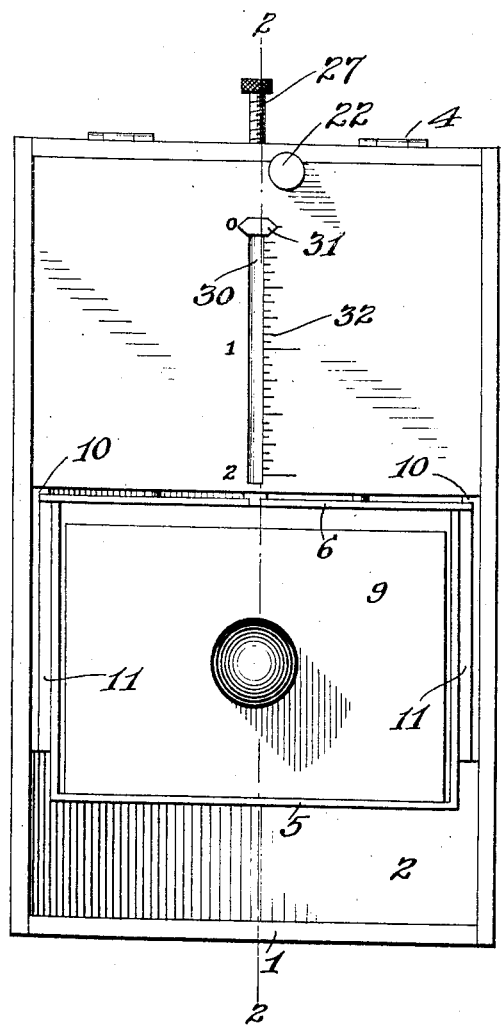
Figure 3:
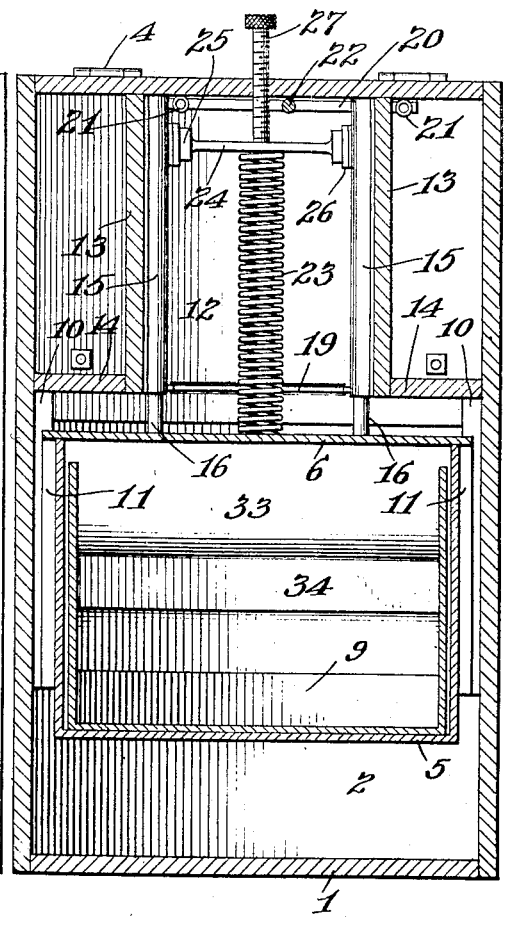

In the drawings forming a part of this specification, and in which like numerals of reference indicate similar parts in the several views, Figure 1 is a front elevation of my improved bin. Fig. 2 is a vertical section taken on the line 2—2 of Fig. 1. Fig. 3 is a section taken on the line 3—3 of Fig. 2. Fig. 4 is a top plan view, the cover of the bin being removed. Fig. 5 is a view similar to Fig. 2, showing the feed plate open and the cover of the bin raised. Fig. 6 is a detail perspective view of the scoop supporting member.

Referring to the drawings, 1 indicates a substantially rectangular bin casing, the lower portion of the front of which is open as shown at 2. This casing may be constructed of sheet metal, wood, or any other desired material, and the rear portion 3 of the cover is hinged as at 4, by means of which the bin may be replenished when the same has been emptied.

Mounted within the forward portion of the bin, and normally disposed in the front open portion 2 thereof there is a scoop supporting member 5. This member is preferably constructed of sheet metal, and comprises the narrow top plate 6, the comparatively wide bottom plate 7 upon which the scoop 9 is adapted to rest, and the side plate 8, the rear portions of which are inclined from top to bottom. It will be understood, however, that this supporting member may be of any other desired construction, or of any preferred material.

Guide cleats 10 are secured to the sides of the bin 1, and are disposed in the U-shaped plates 11 which are secured to the sides of the supporting member 5. The upper plate 6 is provided with recesses in its ends which form, in effect, a continuation of the plates 11. Thus the member 5 is securely held in position against any lateral or transverse movement.

A wall or partition 12 is secured within the bin, and terminates midway between the top and bottom thereof. To this plate the transversely positioned, forwardly extending plates 13 are secured. These plates are suitably braced and spaced from the sides of the bin by means of the blocks 14. Guide members 15 are secured to the opposed faces of the plates 13 and entirely inclose the vertically extending rods 16, the lower ends of which are secured in the top plate 6 of the supporting member 5. These guides extend the entire length of the plates 13, and further insure the proper operation of the supporting member.

Pivotally mounted upon the stud bolts 17 secured in the members 13, are the rods 18 which extend rearwardly below their pivotal point, and have their ends vertically extended downwardly and secured to the forward edge of a discharge plate 19. The upper ends of the rods 18, are located immediately beneath the top of the bin, and are secured to either end of a horizontal bar 20. Also secured to the bar 20, adjacent to its ends are the retractile springs 21, which are normally adapted to maintain the plate 19 in its closed position. Secured at the center of the bar 20 is a transversely extending plunger rod 22. This rod extends exteriorly of the bin casing, and is adapted to force the bar 20 rearwardly, against the tension of the spring 21, whereby the discharge plate will be forced outwardly and the material contained in the rear of the bin allowed to descend into the scoop 9 which has previously been placed upon the supporting member 5.

A spiral spring 23 has one of its ends secured to the top plate 6 of the supporting member 5, the upper end thereof being secured to a horizontal bar 24 of the pivoted U-shaped member 25. The side arms of this member are extended rearwardly and pivoted to bracket plates 26 which are secured to the partition wall. An adjusting rod 27 is threaded through the top of the bin or can and bears upon the horizontal bar 24. As the spring 23 loses its retractile force from constant use, the adjusting rod 27 is threaded downwardly upon the bar 24, whereupon the coils of the spring will be drawn closer together until the proper rectractibility of the same is secured. In this manner absolute accuracy of the weighing mechanism will be maintained at all times.

Secured in the front edge of the top plate 6 of the scoop supporting member 5, there is a vertical bar 28 upon the upper end of which the transversely extending arm 29 is formed. This arm extends through a slot 30 formed in the front of the bin casing, and is provided on its outer end with an indicator 31, which is adapted to move vertically over a graduated scale 32 indicated upon the upper front portion of the casing. Upon one side of the slot 30 the scale indicates ounces and fractions of a pound, and upon the opposite side of the slot the pounds alone are indicated.

To provide for the automatic feeding of the material into the scoop 9, I have devised the following mechanism which is mounted in the rear portion of the bin: A bottom plate 33 is secured to cleats 34 upon the sides and rear of the casing, and forms the bottom of the containing chamber 35. The upper end of the plate 33 is horizontally disposed, and is provided in its forward edge with a recess 36, in which the discharge plate 19, is received. Pivoted to the side of the casing at the rear thereof, is a feed plate 37, which extends across the entire width of the bin. Secured to the hinged top 3 of the bin, at either side thereof, are the cleats 38, extending forwardly beyond the pivot point of the top, and to the forward end of these cleats, there are pivoted the forward ends of rods 39, which are also arranged for engagement in sockets 40 in the feed plate 37. Suitable guide members 41 are secured to the sides of the bin and insure the proper engagement of the rods 39 in the sockets 40. The lower edge of the plate 37 contacts with the surface of the curved bottom plate 33, and has secured thereto at either side of the discharge plate, one end of a retractile spring 42, the other end of which is secured to the rear of the partition 12. Thus it will be seen that when it is desired to fill the containing chamber, that upon raising the cover 3, the feed plate 37 will be forced rearwardly by the downward movement of the pivoted rods 39. As shown in Fig. 5, when the parts are in this position, the hinged cover 3 and the rods 39 are disposed in alinement with relation to each other, whereby the cover will be sustained in its open position. After the compartment 35 has been filled with the desired material, the hinged cover 3 is closed. From reference to the drawings it will be seen that upon the closure of the cover, the retractile springs 42 will draw the hinged feed plate 37 forwardly, and force the material contained within the compartment against the rear of the partition plate 12. As the material is exhausted from the compartment, the plate 37 will continue to move forwardly until the entire contents of the bin have been exhausted, and the plate has again engaged against the rods 39.

In the operation of my improved weighing mechanism, the scoop 9 is first placed upon the supporting member 5, the rear open portion of said scoop being disposed beneath the discharge plate 19. The operator now bears upon the plunger rod 22, and forces the horizontally positioned plate 20 rearwardly. This movement of the plate 20 will pivot the rod 18 upon the studs 17, and the lower portions thereof will be forced forwardly, and withdraw the discharge plate 19 from the recess 36 formed in the upper horizontal portion of the base plate 33 of the containing compartment. It will be obvious that upon withdrawal of the plate 19, the material contained in the chamber 35 will be precipitated through the opening 36 into the scoop 9 positioned beneath the same. As the material continues to be deposited in the scoop the supporting member 5 will gradually descend against the retractile force of the spring 23. At the same time the indicating pointer 31 will move downwardly upon the scale and indicate the exact number of pounds or ounces of the material contained within the scoop. Thus the absolute certainty of the feeding of the material, and the accuracy of the weight thereof is assured.

From the foregoing it will be seen that I have devised an extremely simple construction of weighing mechanism, which is designed to be disposed within grocers' bins, spice cans or the like, whereby the weight of the material contained within the same may be accurately ascertained as it is sold.

It will be understood, of course, that my improved feeding and weighing mechanism is applicable to a variety of forms of cans or bins, and I do not therefore wish to be limited to the construction of bin as disclosed in the drawings.

The various parts may be inexpensively manufactured and when assembled will provide an absolutely positive and accurate weighing mechanism. As all of the parts are easily adjustable, they may be readily replaced when they become worn to such an extent as to interfere with the proper operation of the device. Thus the efficiency and durability of my improved mechanism is greatly increased.

What is claimed is:

1. A weighing mechanism comprising a vertically movable supporting diaphragm, guides arranged upon the sides thereof, vertical guide rods secured to the top of said diaphragm, a vertically disposed bar secured to the top of said diaphragm, an indicator upon the upper end of said bar, a pivoted U-shaped tension regulating member, a retractile spring secured to said diaphragm and to said tension regulating member, said spring being adapted to retain the diaphragm in its normal position, and an adjusting rod for adjusting said tension regulating member.

2. A device of the character described comprising a casing having a horizontal partition arranged therein, transversely positioned plates secured to said partition and extending forwardly thereof, a vertically movable supporting member below said partition, means for retaining said member in its normal position, guides secured to the opposed sides of said plates, rods secured to said supporting member and movable in said guides, a containing compartment in the rear of said partition, a discharge plate extending through said partition into said compartment, and means for reciprocating said plate.

3. A device of the character described comprising a rectangular casing having an open lower front portion, a partition arranged therein, a supporting member mounted in the open portion of the casing, a spiral spring disposed between said supporting member and the top of said casing, and adapted to retain said member in its normal position, U-shaped guide plates secured to the sides of said supporting member, cleats arranged on the sides of said casing and adapted for engagement in the U-shaped guide plates, a containing compartment in the rear of said partition, said compartment having a discharge opening in the bottom thereof, a reciprocatory plate normally disposed in said opening, and means for reciprocating said plate to open and close the discharge opening.

4. The combination with a bin, of a horizontal partition arranged therein, transverse walls secured to said partition and extending forwardly thereof, a supporting diaphragm arranged below said wall, U-shaped guide plates secured to the sides of the diaphragm, cleats secured to the sides of the bin and adapted to have sliding engagement in said guide plates, vertical rods secured to the top of the diaphragm, guide members secured to the sides of said walls and adapted to receive said rods, an indicator carried by said diaphragm, a U-shaped tension regulating member, a receptacle having its ends secured to said diaphragm and to said tension regulating member, said member being pivoted at its inner end to the partition, a containing compartment in the rear of said plate, a hinged top for said compartment, a discharge plate extending through said partition, said compartment having an opening formed in the bottom thereof, normally closed by said plate, means for reciprocating said plate to open and close said opening, a feed plate pivoted in the rear of said compartment, and means for moving said plate forwardly upon the raising of said cover.

5. The combination with a rectangular bin, the lower portion of the front of said bin being open, of a horizontal partition arranged therein, a supporting diaphragm disposed in the lower open portion of the bin and below said partition, a vertical slot in the closed portion of the front of said bin, an indicator carried by said diaphragm and extending through said slot, graduations upon either side of said slot, a containing compartment in the rear of said bin having a hinged cover, the bottom of said compartment being downwardly curved, and having an opening in the forward edge thereof, a discharge plate extending through said partition and normally disposed in said opening, rods secured to the ends of said plate and extending upwardly and outwardly therefrom, said rods being pivoted to walls arranged between the partition and the front of the bin, a horizontal bar secured to the upper end of said rod, a plunger rod secured to said bar and extending exteriorly of the bin, a retractile spring secured to said bar and to the front of the bin, a feed plate pivoted to the sides of said bin at the rear upper end thereof, retractile springs secured adjacent to the lower edge of said plate and to said partition, said springs being adapted to draw said plate forwardly, and means carried by the cover adapted to depress said feed plate upon the raising thereof.

6. The combination with a rectangular bin, the lower portion of the front of said bin being open, of a horizontal partition arranged therein, transverse walls arranged between said partition and the front of the bin, a supporting diaphragm disposed beneath said walls, guide rods arranged upon the top thereof, guides upon the opposed faces of said walls adapted to receive the vertically extending guide rods secured to said diaphragm, said diaphragm being vertically movable within the open portion of the bin, a spring for returning said diaphragm to its normal position, means for regulating the tension of said spring, a bar secured to the top of said diaphragm, an indicating arm formed upon the upper end thereof and movable in a vertical slot in the front wall of said bin, a pointer upon the outer end of said arm, an indicating scale upon either side of said slot, a reciprocatory discharge plate extending through said partition, means for operating said plate, a containing compartment in the rear of said bin, a hinged cover therefor, said compartment having an opening in the bottom thereof adapted to receive said discharge plate, a feed plate pivoted to the sides of said compartment, cleats secured to the under side of said cover at the sides thereof, rods pivoted in the front ends of said cleats, the other ends of said rods being arranged for engagement against said feed plate, guides secured in the sides of said bin to receive said rods, and retractile springs secured to said partition and to said feed plate normally adapted to move the feed plate forwardly.

In testimony whereof I affix my signature, in presence of two witnesses.

ALBERT H. THIELE.

Witnesses:
MILTON F. BLUIM,
JOHN HENRY SALVIN.